United States Patent Office 3,404,040
Patented Oct. 1, 1968

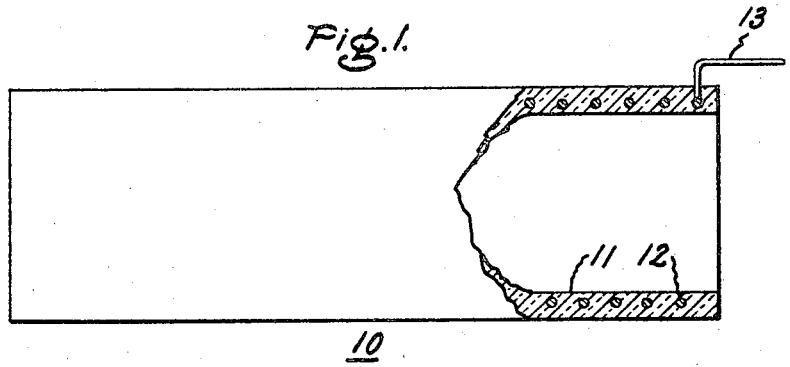
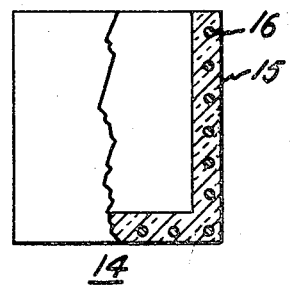
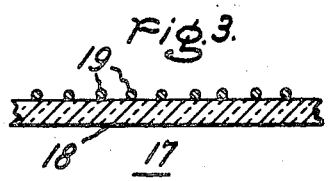
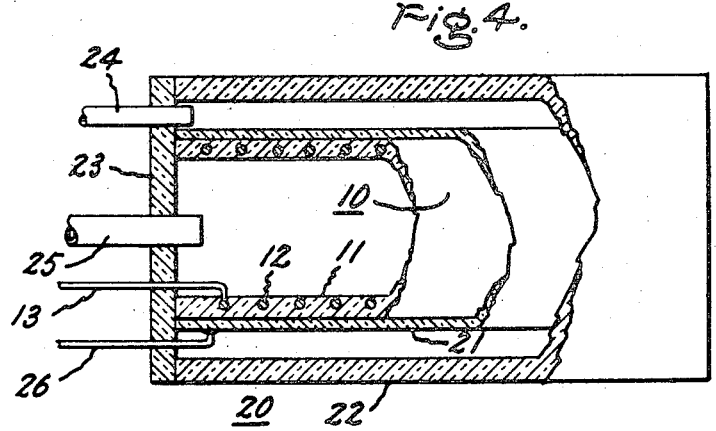

3,404,040
ARTICLE COMPRISING STABILIZED ZIRCONIA AND A CURRENT COLLECTOR EMBEDDED THEREIN
Stephan P. Mitoff, Elnora, N.Y., William E. Tragert, Chagrin Falls, Ohio, and Robert L. Fullman, Schenectady, N.Y., assignors to General Electric Company, a corporation of New York
Filed June 29, 1965, Ser. No. 468,033
3 Claims. (Cl. 136—86)

This invention relates to high temperature fuel cells, and more particularly to composite articles providing electrolyte-anode structures for such high temperature fuel cells.

Fuel cells, operable at high temperatures in the range of 1000° C. to 1200° C., are shown in U.S. Letters Patent 3,138,487 and 3,138,490 which are assigned to the same assignee as the present application. Each of these fuel cells employs a solid oxygen-ion conducting electrolyte, solid electrodes, fuel and oxidant supplies for the respective electrodes, and electrical leads connected to the respective electrodes. Such fuel cells provide a low voltage direct current power source on a continuous basis. Such cells have application in various chemical process industries, such as the manufacture of aluminum and the electro-refining of copper. Furthermore, these cells can be employed to operate direct current motors.

In copending patent application, Ser. No. 412,158, filed Nov. 18, 1964, and assigned to the same assignee as the present application, there is disclosed and claimed a solid electrolyte consisting of 0.5 to 10.5 weight percent of iron oxide, and the balance being a solid oxygen-ion conducting material.

The present invention is directed to an improved composite article providing an electrolyte-anode structure for a high temperature fuel cell.

It is an object of our invention to provide an improved composite article forming an electrolyte-anode structure for a high temperature fuel cell.

It is another object of our invention to provide an improved high temperature fuel cell which employs an improved composite article.

It is a further object of our invention to provide an improved composite article employing a current collector.

In carrying out our invention in one form, a composite article comprises a member consisting of a solid oxygen-ion conducting metal oxide and, at least partially dissolved therein, 5.0 to 10.0 weight percent of iron oxide, and an electrically conductive current collector in mechanical and electrical contact with one surface of the member.

These and various other objects, features and advantages of the invention will be better understood from the following description taken in connection with the accompanying drawing in which:

FIGURE 1 is a sectional view of a composite article embodying our invention;

FIGURE 2 is a sectional view of a modified composite article;

FIGURE 3 is a sectional view of another modified composite article; and

FIGURE 4 is a sectional view of a high temperature fuel cell which employs a composite article embodying our invention.

In FIGURE 1 of the drawing, a composite article or body is shown generally at 10 which comprises a hollow tubular member 11 consisting of a solid oxygen-ion conducting metal oxide and, at least partially dissolved therein, 5.0 to 10 weight percent of iron oxide, and an electrically conductive current collector 12 in the form, for example, of a nickel coil in mechanical and electrical contact with the interior surface of member 11 by being embedded therein. An anode lead 13 extends from current collector 12. Composite article 10 provides an electrolyte-anode structure for employment in a high temperature fuel cell. The portion of member 11 adjacent to collector 12 and collector 12 comprise the anode while the remaining portion of member 11 comprises the electrolyte. When a cathode is employed with composite article 10, it is provided as a tightly adherent layer on the surface opposite the surface adjacent collector 12 of member 11. For example, such a cathode consists of lithiated nickel oxide, doped tantalum pentoxide, or a solid, porous oxygen-ion conducting metal oxide matrix with silver impregnated and filling the pores thereof.

In FIGURE 1, electrically conductive current collector 12 is shown embedded in the interior surface of member 11. Collector 12 is, if desired, embedded on the exterior surface of member 12 thereby providing the anode on the exterior surface.

In FIGURE 2 of the drawing, there is shown a modified composite article 14 in the form of a container 15 consisting of the same material as member 11 shown in FIGURE 1 of the drawing. A current collector, in the form of nickel coil 16, is embedded in the exterior surface of container 15 whereby the exterior surface is the anode.

In FIGURE 3 of the drawing, there is shown another modified composite article 17 in the form of a plate 18 of the same material as member 11 shown in FIGURE 1 of the drawing. A current collector, in the form of a nickel coil 19, is shown in mechanical and electrical contact with the upper surface of plate 16 whereby the upper surface is the anode.

In FIGURE 4 of the drawing, there is shown a high temperature fuel cell 20 which includes composite article 10 of FIGURE 1 of the drawing. Composite article 10 comprises a hollow tubular member 11 consisting of a solid oxygen-ion conducting metal oxide and, at least partially dissolved therein, 5.0 to 10.0 weight percent of iron oxide, and an electrically conductive current collector 12 in the form of a nickel coil embedded in the interior surface of member 11. Coil 12 and the portion of member 11 adjacent the coil comprise the anode while the remaining portion of member 11 comprises the electrolyte. Electrode 21 on the exterior surface of the electrolyte portion on member 11 functions as a cathode. For example, cathode 21 consists of lithiated nickel oxide. An outer, hollow member 22, such as a tube of alumina, surrounds and is spaced from the exterior surface of cathode 21 to provide an air passage between cathode 21 and the inner surface of tube 22. A cover 23, for example, the same materials as tube 22, is provided at the inlet end of tube 22.

An inlet tube 24 extends into the air passage between cathode 21 and tube 22 to introduce a gaseous oxidant containing molecular oxygen from a source (not shown) into this passage. A second tube 25 is provided through cover 23 and communicates with the space defined by the interior surface of member 11 and coil 12. Tube 25 introduces a fuel, such as hydrogen, from a source (not shown) into this space. Conducting metallic lead 13, for example, of nickel, extends through cover 23 and is electrically connected to coil 12 or is a continuation thereof. A conducting metallic lead 26, for example, of platinum or palladium, extends through cover 23 and is in contact with cathode 21 of the cell. The free ends of leads 13 and 26 are connected to apparatus, such as an electric motor (not shown), being operated by the cell.

A very satisfactory composite article for a high temperature fuel cell operable above 600° C. is provided by a solid oxygen-ion conducting metal oxide, and at least partially dissolved therein, 5.0 to 10.0 weight percent of iron oxide, and an electrically conductive current collector in mechanical and electrical contact with one surface of the member.

Such a composite article is a mixed conducting oxide which provides both ionic and electronic conductivity. The oxygen-ion conducting metal oxide provides the ionic conductivity while solution in it of iron oxide provides the electronic conductivity. The conductivity of the composite article has an electronic contribution at low oxygen pressures thereby preventing polarization at the fuel side or anode surface of the member. The current collector, which is in contact with the anode surface of the member, provides additional electronic conductivity to produce a satisfactory anode. This anode comprises the current collector and the surface of the member adjacent the current collector. The conductivity of the opposite surface or cathode surface of the member is essentially ionic at higher oxygen pressures whereby only ions can leave from the gaseous oxidant side. Thus, no internal shorting occurs. The improved composite article of our invention is employable in the form of a hollow tubular member, a flat plate or a container.

We prefer to employ iron oxide for electronic conductivity in our member. The preferred range for iron oxide, which includes $Fe_3O_4$, $FeO$ and $Fe_2O_3$, in such a member is from 5.0 weight percent to 10.0 weight percent $Fe_3O_4$, or an equivalent amount of iron introduced as $Fe_2O_3$, or $FeO$ in the member. The preferred oxygen-ion conducting metal oxide in our member structure is solid stabilized zirconia. However, other solid oxygen-ion conducting metal oxides, such as doped thoria, are satisfactory for incorporating the electronically conductive iron oxide therewith.

Solid stabilized zirconia, which is a solid oxygen-ion conducting material or oxygen-ion conducting metal oxide, is a compound with a cubic crystal structure consisting of zirconia to which is added at least one or a combination of several specific oxides such as calcium oxide, yttrium oxide, or a mixture of rare earth oxides. For example, a suitable solid zirconia material is stabilized with 14 molecular percent calcium oxide. Other compositions of stabilized zirconia, which are employable for the oxygen-ion member and as the oxygen-ion conducting metal oxide in the electrode, are discussed in "Oxide Ceramics" by Ryshkewitch, Academic Press, 1960, particularly on pages 354, 364 and 376 thereof.

Solid doped thoria is also a solid oxygen-ion conducting metal oxide which consists of thoria to which is added at least one or a combination of several specific oxides such as calcium oxide, yttrium oxide, or a mixture of rare earth oxides. For example, a solid doped thoria consists of thoria which is doped with the addition of 4 molecular percent calcium oxide to increase its oxygen-ion conductivity.

The electrically conductive current collector is in mechanical and electrical contact with one surface of the member. Such mechanical and electrical contact is maintained, for example, by positioning the collector in contact with one surface of the member or by embedding the collector in one surface of the member. Such a collector is suitable in various forms, such as a coil, screen or grid. While a nickel coil is specifically described above for the collector, various high temperature materials, which are electrically conductive, are satisfactory.

An efficient stable fuel cell is constructed which has a composite article comprising a member consisting of a solid oxygen-ion conducting metal oxide and, at least partially dissolved therein, 5.0 to 10.0 weight percent of iron oxide, and an electrically conductive current collector in mechanical and electrical contact therewith; means for supplying a fuel to the current collector side of said member, an electrode in contact with the opposite surface of the member, and means for supplying a gaseous oxidant containing molecular oxygen to the electrode.

In such a fuel cell, a gaseous oxidant containing molecular oxygen is supplied during cell operation to the electrode which functions as the cathode. Fuel is supplied during cell operation to the current collector and adjacent surface of the member functioning as the anode.

In the preparation of the composite article shown in FIGURES 1, 2 and 3 of the drawing, the solid oxygen-ion conducting metal oxide is prepared from zirconia powder which has been stabilized by addition of 13.75 weight percent of yttria. Such powder is available on the commercial market. Five to 10 weight percent of iron oxide powder, as $Fe_3O_4$, is added to the stabilized zirconia powder which powders are then mixed and ground together. This mixture is then calcined at 1300° C. which results in a partially sintered product. This partially sintered product is reground to provide a powder which is pressed into a particular configuration such as a hollow tubular member around a current collector whereby the current collector is embedded into the interior surface of the member. In FIGURE 2, the current collector in coil form is embedded in the exterior surface of a container configuration pressed from the powder. In FIGURE 3, the powder is pressed into the form of a plate. The pressed configuration is then fired in a non-oxidizing atmosphere, such as nitrogen, to a temperature above 1350° C. to provide a sintered body. In FIGURE 3, the current collector is positioned in mechanical and electrical contact with one surface of the plate member.

If desired, the above composite article of our invention is then provided with a porous layer of lithiated nickel oxide on the exterior surface thereof to provide a cathode thereon. Such a lithiated nickel oxide cathode is initially painted from a slurry onto the exterior surface of the article. The painted article is subsequently dried and air fired to form the adherent lithiated nickel oxide cathode.

As shown in FIGURE 4, a fuel cell is assembled by employing the composite article of FIGURE 1 and applying a lithiated nickel oxide cathode thereon as described above. This composite article with cathode, is then assembled with other components as described above to form a fuel cell 20.

Heat, such as waste heat, is supplied from a source (not shown) to fuel cell 20 to raise the temperature of member 11 and cathode 21 of cell 20 above 600° C. A gaseous oxidant containing molecular oxygen, such as air, is supplied through tube 24 to the air passage between cathode 21 and the interior surface of tube 22. A gaseous fuel such as hydrogen is supplied through tube 25 to the chamber defined by the interior surface of member 11 and coil 12, the anode. The reaction at the surface of the cathode is as follows:

(1) 

The oxygen ions move through the cathode 21 and electrolyte portion of member 11 to combine with hydrogen in accordance with the following reaction at the interior surface of the member 11, the anode side:

(2) $H_2 + O^= \rightarrow H_2O + 2e$

The electrons, which are given up at the anode surface are conducted through coil 12 and lead 13 to apparatus, for example, an electric motor (not shown), being operated while oxygen at the cathode combines with the returning electrons. Water vapor, which is generated at the anode, is released through the opening at the right-hand end of the cell to the atmosphere.

An example of a composite article embodying our invention is as follows:

The member of a composite article is prepared from 80.2 weight percent zirconia powder, 12.8 weight percent yttria and 7 weight percent iron oxide. These powders are mixed and ground together. This mixture is then calcined at 1300° C. which results in a partially sintered product. This partially sintered product is reground to provide a powder. A disc is pressed from the reground powder and fired in air at a temperature above 1350° C. to provide a sintered body. The disc is electroded with platinum.

The disc is tested to determine that it has essentially ionic conductivity at higher oxygen pressures and an electronic contribution at low oxygen pressures. The disc is tested by a method devised for making ionic transport measurements which method is set forth in an article entitled, "Bulk Versus Surface Conductivity of MgO Crystals," by Dr. S. P. Mitoff on pages 2561 and 2562 of the Oct. 15, 1964, isue of the "The Journal of Chemical Physics," vol. 41, No. 8. In this test, the above disc is exposed at 1000° C. at one atmosphere of pressure by employing an oxygen partial pressure differential. Oxygen is supplied to one surface of the member while air is supplied to the other surface of the member. The disc exhibits no electronic conductivity but exhibits an ionic conductivity of 0.07 ohm$^{-1}$cm.$^{-1}$. The disc is then tested in a similar manner wherein a carbon monoxide-carbon dioxide mixture is supplied to one surface while a different carbon monoxide-carbon dioxide mixture is supplied to the other surface. The disc exhibits an electronic conductivity of 0.015 ohm$^{-1}$cm.$^{-1}$ and exhibits an ionic conductivity of 0.085 ohm$^{-1}$cm.$^{-1}$. Thus, the disc shows essentially ionic conductivity at higher oxygen pressure and shows an electronic contribution at low oxygen pressure.

A composite article is produced whose member is made from 80.2 weight percent zirconia powder, 12.8 weight percent yttria, and 7.0 weight percent iron oxide. These powders are mixed and ground together. This mixture is then calcined at 1300° C. which results in a partially sintered product. This partially sintered product is reground to provide a powder.

An electrical current collector is provided in the form of a nickel coil. The above reground powder is pressed into the form of a hollow tubular member around the nickel coil whereby the coil is embedded into the interior surface of the member. The hollow tubular member is then fired in nitrogen at a temperature of 1400° C. for 12 hours to produce a composite article.

This composite article is employed as the electrolyte-anode body in a fuel cell. A lithiated nickel oxide cathode is provided on the exterior surface of the composite article. This structure is then assembled in accordance with FIGURE 4 of the drawing to produce a fuel cell. This cell is operated by employing a fuel such as hydrogen gas and a gaseous oxidant such as oxygen in accordance with the above-described operation of this cell.

While other modifications of this invention and variations thereof which may be employed within the scope of the invention have not been described, the invention is intended to include such as may be embraced within the following claims.

What we claim as new and desire to secure by Letters Patent of the United States is:

1. A composite article comprising a member consisting of solid stabilized zirconia and, at least partially dissolved therein, 5.0 to 10.0 weight percent of iron oxide, and an electrically conductive current collector bonded to and in electrical contact with one surface of said member.

2. A composite article comprising a member consisting of solid stabilized zirconia and, at least partially dissolved therein, 5.0 to 10.0 weight percent of iron oxide, and an electrically conductive current collector embedded in one surface of said member 3. A composite article comprising a member consisting of solid stabilized zirconia and, at least partially dissolved therein, 5.0 to 10.0 weight percent of iron oxide, and a nickel coil bonded to and in electrical contact with one surface of said member.

References Cited

UNITED STATES PATENTS

| | | | |
|---|---|---|---|
| 1,491,224 | 4/1924 | Cooper | 106—57 |
| 3,192,070 | 6/1965 | Tragert et al. | 136—86 |
| 3,281,273 | 10/1966 | Oser | 136—86 |
| 2,914,596 | 11/1959 | Gorin et al. | 136—86 |
| 2,535,526 | 12/1950 | Ballard et al. | 106—57 |

WINSTON A. DOUGLAS, *Primary Examiner.*

H. FEELEY, *Assistant Examiner.*